(12) United States Patent
Leebow

(10) Patent No.: US 9,046,988 B2
(45) Date of Patent: Jun. 2, 2015

(54) SYSTEM FOR RECORDING, SUGGESTING, AND DISPLAYING FANS OF A SUBJECT

(76) Inventor: Eric Leebow, New York, NY (US)

( * ) Notice: Subject to any disclaimer, the term of this patent is extended or adjusted under 35 U.S.C. 154(b) by 204 days.

(21) Appl. No.: 12/781,012

(22) Filed: May 17, 2010

(65) Prior Publication Data

US 2011/0283213 A1    Nov. 17, 2011

(51) Int. Cl.
*G06F 3/0481* (2013.01)
*G06F 3/0486* (2013.01)

(52) U.S. Cl.
CPC .......... *G06F 3/04815* (2013.01); *G06F 3/0486* (2013.01); *G06F 2203/04802* (2013.01)

(58) Field of Classification Search
CPC .............. G06F 3/0482; G06F 3/04815; G06F 3/04817; G06F 2203/04802; G06F 17/30126; G06F 17/30994; G06F 3/04845; G06F 3/048; G06F 3/04842; G06F 21/36; G06T 17/00; G06T 19/00; H04N 13/0275; H04N 21/81
USPC .................. 715/214, 836, 848, 849, 852, 782
See application file for complete search history.

(56) References Cited

U.S. PATENT DOCUMENTS

| | | | |
|---|---|---|---|
| 6,710,788 B1* | 3/2004 | Freach et al. ................. | 715/778 |
| 7,216,305 B1* | 5/2007 | Jaeger ........................... | 715/849 |
| 8,271,898 B1* | 9/2012 | Mattos et al. ................. | 715/784 |
| 2007/0028187 A1* | 2/2007 | Katsuyama .................... | 715/810 |
| 2007/0189579 A1* | 8/2007 | Crookham et al. ........... | 382/100 |
| 2008/0238916 A1* | 10/2008 | Ghosh et al. .................. | 345/419 |
| 2009/0195540 A1* | 8/2009 | Ueno ............................. | 345/420 |
| 2011/0083078 A1* | 4/2011 | Ju .................................. | 715/738 |
| 2011/0164029 A1* | 7/2011 | King et al. ..................... | 345/419 |
| 2011/0187709 A1* | 8/2011 | Lee et al. ....................... | 345/419 |
| 2011/0271209 A1* | 11/2011 | Jones et al. .................... | 715/753 |
| 2011/0271210 A1* | 11/2011 | Jones et al. .................... | 715/753 |
| 2012/0098754 A1* | 4/2012 | Kim .............................. | 345/173 |
| 2012/0269380 A1* | 10/2012 | Crookham et al. ........... | 382/100 |

* cited by examiner

*Primary Examiner* — Shen Shiau (74) *Attorney, Agent, or Firm* — Thompson Hine LLP (57) ABSTRACT

A system for recording and displaying that an entity is a fan of at least one subject may include a graphical user interface including a graphical representation of a three-dimensional shape having at least a first face and a second face. The graphical representation of the three-dimensional shape may symbolize the entity or the subject in the system and the first face of the three-dimensional shape includes information corresponding to the entity or the subject. The system may further include a recording logic configured to receive information declaring that the entity or the subject is a fan. The system may further include a displaying logic configured to display on the graphical representation of the three-dimensional shape information corresponding to the entity or the subject.

15 Claims, 4 Drawing Sheets

Figure 4

SYSTEM FOR RECORDING, SUGGESTING, AND DISPLAYING FANS OF A SUBJECT

FIELD OF THE INVENTION

The invention relates to a system for recording, suggesting, and displaying fans of a subject.

BACKGROUND OF THE INVENTION

In the last few years, social media and the ability for people to connect to other people via the internet have advanced tremendously. Sites such as Facebook and Twitter have seen their popularity skyrocket. These sites, as well as many others available on the web, allow users to communicate and connect in ways that were previously unimaginable.

However, even with these advances in web based social media, indicating to others on the web that one is a fan of a subject of a subject remains laborious and a not so straightforward process. Ideally, the process of indicating to others of whom or of what a user is fan would be a seamless process.

SUMMARY OF THE INVENTION

The present invention makes possible a system where a user can become a "fan" of anything by means that are user-friendly and seamless. In this way, users can record of whom or of what they are fans. Users can also suggest friends that may be fans of different subjects. Ultimately, the system can display and make decisions based on users and those subjects of which the users are fans.

A system for recording and displaying that an entity is a fan of at least one subject may include a graphical user interface including a graphical representation of a three-dimensional shape having at least a first face and a second face. The graphical representation of the three-dimensional shape may symbolize the entity or the subject in the system and the first face of the three-dimensional shape includes information corresponding to the entity or the subject.

The system may further include a recording logic configured to receive information declaring that the entity or the subject is a fan. The system may further include a displaying logic configured to display on the graphical representation of the three-dimensional shape information corresponding to the entity or the subject.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

The following includes definitions of selected terms employed herein. The definitions include various examples, forms, or both of components that fall within the scope of a term and that may be used for implementation. The examples are not intended to be limiting. Both singular and plural forms of terms may be within the definitions.

"Computer-readable medium," as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks, and so on. Volatile media may include, for example, optical or magnetic disks, dynamic memory and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Data store," as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic," as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Query," as used herein, refers to a semantic construction that facilitates gathering and processing information. A query might be formulated in a database query language like structured query language (SQL) or object query language (OQL). A query might be implemented in computer code (e.g., C#, C++, Javascript) that can be employed to gather information from various data stores and/or information sources.

"Signal," as used herein, includes but is not limited to one or more electrical or optical signals, analog or digital signals, data, one or more computer or processor instructions, messages, a bit or bit stream, or other means that can be received, transmitted and/or detected.

"Software," as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically and/or statically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Figure 1:
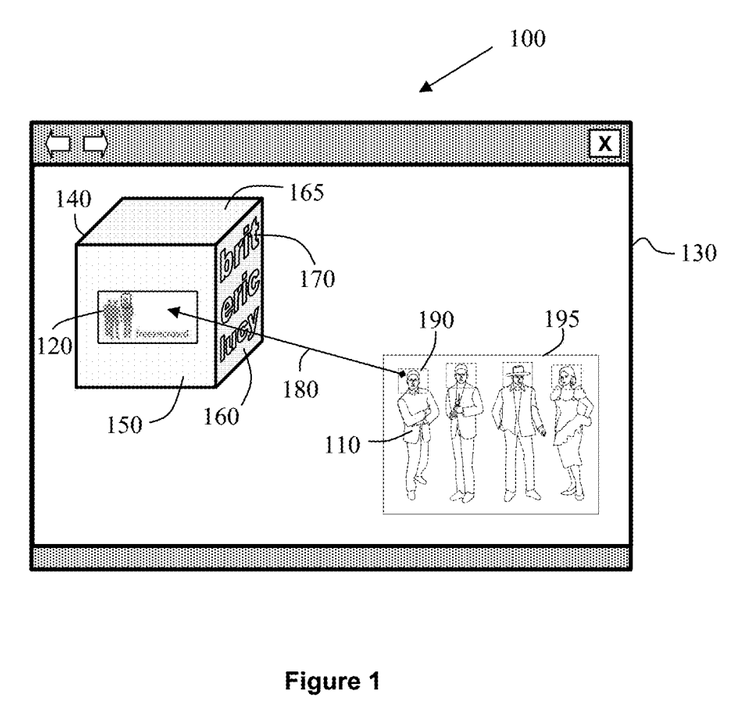
FIG. 1 illustrates an embodiment of a system for recording and displaying fan information of a fan of a subject.

FIG. 1 illustrates an embodiment of a system 100 for recording and displaying a fan 110 of a subject 120.

The system 100 includes a graphical user interface (GUI) 130 including a graphical representation of a three-dimensional shape 140. In the illustrated embodiment, the graphical representation of the three-dimensional shape 140 is a graphical representation of a cube, an iFanCube. The three-dimensional shape 140 includes a number of faces including a first face 150, a second face 160, and a third face 165.

In one embodiment, the shape 140 symbolizes the subject 120 in the system 100. The first face 150 may include information corresponding to the subject 120. In the illustrated embodiment, the first face 150 includes a logo corresponding to the subject 120. In other embodiments, information corresponding to the subject 120 other than a logo may be included on the first face 150 or other faces of the shape 140.

The system 100 may be used to record or display fan information 170 corresponding to a fan 110 of the subject 120. The system 100 may receive information declaring that the fan 110 or another user in the system seeks to record that the fan 110 is a fan of the subject 120.

For example, the fan 110 or another user in the system may drag and drop 180 at least a portion 190 of an image 195 on to the shape 140. The image 195 or the portion 190 corresponds to the fan 110. In one embodiment, the image 195 or the portion 190 have encoded information that identifies the fan 110. For example, the image 195 or the portion 190 may be encoded with fan information 170 identifying the fan 110 in the system 100 by name, by username, and so on.

In another example (not shown), the system 100 may receive information declaring that the fan 110 or another user in the system seeks to record that the fan 110 is a fan of the subject 120 by dragging and dropping the shape 140 onto the portion 190 or the image 195 or by dragging and dropping the portion 190 or the image 195 onto the shape 140.

In yet another example (not shown) the system 100 may receive information declaring that the fan 110 or another user in the system seeks to record that the fan 110 is a fan of the subject 120 by one of the first face 150, the second face 160 and a third face 165 being dragged and dropped on to the portion 190 or the image 195 or by the portion 190 or the image 195 being dragged and dropped on to the first face 150, the second face 160 or the third face 165.

The system 100 records the fan 110 as a fan of the subject 120 at least in part as a result of receiving the information declaring that the fan 110 or the other user seeks to record that the fan 110 is a fan of the subject 120.

In the illustrated embodiment, the GUI 130 is shown as a single web browser window. In other embodiments, the GUI 130 may take other forms. For example, the GUI 130 may include multiple web browser windows (not shown). In this example, the shape 140 may reside within a first web browser window and the portion 190 or the image 195 may reside within a second web browser window. The user may drag and drop the portion 190 or the image 195 from the second web browser window on to the shape 140 in the first web browser window. Or the user may drag and drop the shape 140 from the first web browser window onto the portion 190 or the image 195 in the second web browser window.

In one embodiment (not shown), the portion 190 or the image 195 has encoded identifying information regarding the fan 110. When the portion 190 or the image 195 is, for example, dragged and dropped on a face of the shape 140, the system 100 receives a signal including the encoded identifying information. The system 100 decodes the identifying information and records that the user 110 identified by the dropped portion 190 or image 195 is a fan of the subject 120 represented by the shape 140.

In one embodiment (not shown), when the shape 140 is dragged towards the portion 190 or the image 195, the shape 140 flies or floats on the GUI 130 towards the portion 190 or the image 195. In one embodiment (not shown), when the shape 140 is dragged towards the portion 190 or the image 195, the shape 140 flies or floats on the GUI 130 in sync or in replacement of the cursor towards the portion 190 or the image 195. In another embodiment (not shown), when a user visits a website that includes material that may be fanned, the shape 140 indicates the material within the website that can be fanned by flying or floating around the GUI 130 and towards the material that may be fanned.

The system 100 may also display on the faces of the shape 140 that the fan is a fan of the subject 120. In the illustrated embodiment, the system 100 displays on the second face 160 the fan information 170 corresponding to the fan 110 who is now recorded as a fan of the subject 120. In this example, the fan 110 is named Brit as reflected by the fan information 170. The fan information 170 displayed may take various forms including, without limitation, names, nicknames, usernames, pictures, photos, combinations thereof and so on. Display of the fan information 170 indicates to other users of the system 100 that the identified is a fan of the subject 120. The system of claim 100 may also display information corresponding to a plurality of additional fans of the subject 120.

In one embodiment (not shown), the system may display on a face of the shape 140 the fan information 170 corresponding to the fan 110 after a user queries the system 100 for information on fans of the subject 120. In other embodiments, the system 100 may display information other than the fan information 170. For example, the system 100 may display information corresponding to other fans of the subject, other subjects associated with the subject, other subjects which the fan has fanned, other subjects that friends of the fan have fanned, and so on.

In some embodiments, the system 100 may incorporate various add-ons (e.g. widgets, gadgets, feeds, and so on) as well as interfaces to other social media or web sites (e.g. Twitter, Facebook, and so on). These add-ons may interface with the shape 140 within the GUI 130 for adding features to the system 100. In one embodiment (not shown) the shape 140 may further include tabs or compartments within the faces of the shape 140 to display additional features or add-ons. The tabs or compartments may also be used to display additional information regarding the fan 110 or the subject 120. Additional information may include links to blogs or websites associated with the fan 110 or the subject 120.

In one embodiment (not shown), a face of the shape 140 displays a site map of a website associated with the fan 110 or with the subject 120. Thus, a user may browse the contents of the website associated with the fan 110 or with the subject 120 exclusively through the use of the shape 140, the iFanCube.

Figure 2:
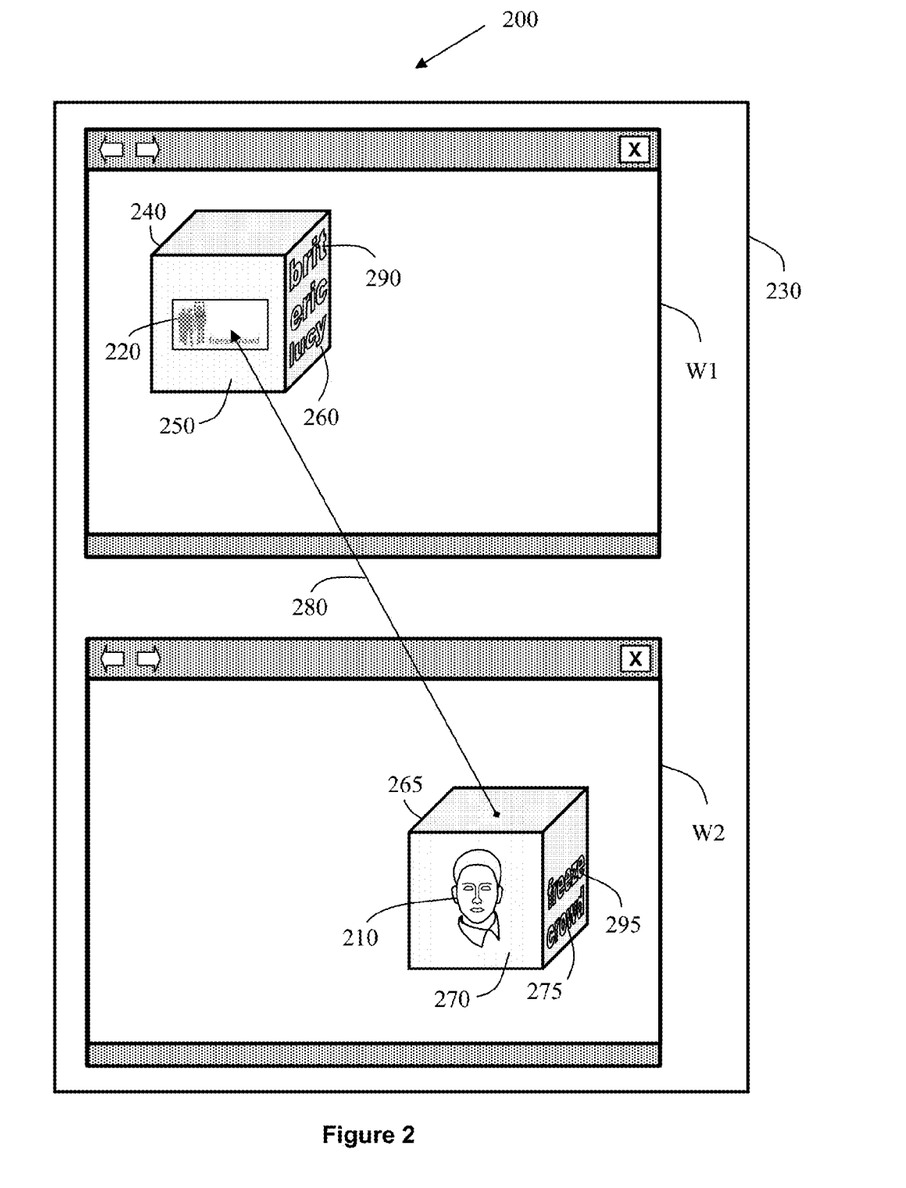
FIG. 2 illustrates an embodiment of a system for recording and displaying fan information of a fan of a subject.

FIG. 2 illustrates an embodiment of a system 200 for recording and displaying a fan 210 of a subject 220.

The system 200 includes a GUI 230 including a graphical representation of a first three-dimensional shape 240. The first three-dimensional shape 240 includes a number of faces including a first face 250 and a second face 260. The first shape 240 symbolizes the subject 220 in the system 200. The first face 250 may include information corresponding to the subject 220. In the illustrated embodiment, the first face 250 includes a logo corresponding to the subject 220. In other embodiments, information corresponding to the subject 220 other than a logo may be included in the first face 250 or other faces of the first shape 240.

The GUI 230 may further include a graphical representation of a second three-dimensional shape 265. In the illustrated embodiment, the graphical representation of the second three-dimensional shape 265 is a graphical representation of a cube. The second three-dimensional shape 265 includes a number of faces including a first face 270 and a second face 275. The second shape 265 symbolizes the fan 210 in the system 200. The first face 270 may include information corresponding to the fan 210. In the illustrated embodiment, the first face 270 includes a photo corresponding to the fan 210. In other embodiments, information corresponding to the fan 210 other than a photo may be included on the first face 270 or other faces of the second shape 265.

The system 200 may be used to record or display that a user is a fan of the subject 220. The system 200 may receive information declaring that the user is a fan of the subject 220.

For example, the system 200 may receive information declaring that the fan 210 is a fan of the subject 220 by the second shape 265 being dragged and dropped 280 on to the first shape 240. In another example, the system 200 may receive information declaring that the fan 210 is a fan of the subject 220 by a face of the second shape 265 being dragged and dropped onto a face of the first shape 240. In yet another example, the system 200 may receive information declaring that the fan 210 is a fan of the subject 220 by the first shape 240 being dragged and dropped on to the second shape 265. The system 200 may also receive information declaring that the fan 210 is a fan of the subject 220 by a face of the first shape 240 being dragged and dropped on to a face of the second shape 265.

The system 200 records that a user is a fan of the subject 220 at least in part as a result of receiving the information declaring that the user seeks to record that the user is a fan of the subject 220.

In the illustrated embodiment, the GUI 230 is shown including two web browser windows W1 and W2. In this example, the first shape 240 may be dragged from the first web browser window W1 on to the second shape 265 in the second web browser window W2, or vice versa. In other embodiments, the GUI 230 may take other forms. For example, the GUI 230 may include more than two web browser windows or the GUI 230 may include a single web browser window. In the latter example, a user may drag and drop the first shape 240 or the second shape 265 onto the other within the single web browser window.

In one embodiment, encoded information identifying the subject 220 is associated with the first shape 240 and encoded information identifying the fan 210 is associated with the second shape 265. When the second shape 265 is, for example, dragged and dropped on the first shape 240, the system 200 receives a signal including the encoded identifying information. The system 200 decodes the identifying information and records that the fan 210 is a fan of the subject 220.

The system 200 may display that the a user is a fan of the subject 220 on the first shape 240. In the illustrated embodiment, the system 200 displays on the second face 260 fan information 290, the fan's name Brit, corresponding to the fan 210 who is now recorded as a fan of the subject 220. The fan information 290 displayed may take various forms including, without limitation, names, nicknames, usernames, pictures, photos, combinations thereof and so on.

The system 200 may also display that the fan 210 is a fan of the subject 220 on the second shape 265. In the illustrated embodiment, the system 200 displays on the second face 275 subject information 295 corresponding to the subject 220 of whom the fan 210 is now a fan.

On other faces (not shown) of the three dimensional shape, the system 200 may also display the geographical location of the fan 210 on a map. In one example application, a user at a movie theater may become a fan of the movie he/she is watching. The system 200 may determine the geographical location of the user as the movie theater. The system 200 may then communicate statistical information regarding who is a fan of the movie, the actors, the director, and so on. Continuing with the movie theater illustration, in another example application, the user may go from the movie theatre to a party. The user would be able to see on the map who in close proximity to him/her is also a fan of the movie, or of a song, artist, and so on. This may serve as an ice-breaker as it may be easier to engage in conversation with a person having similar interests.

Figure 3:
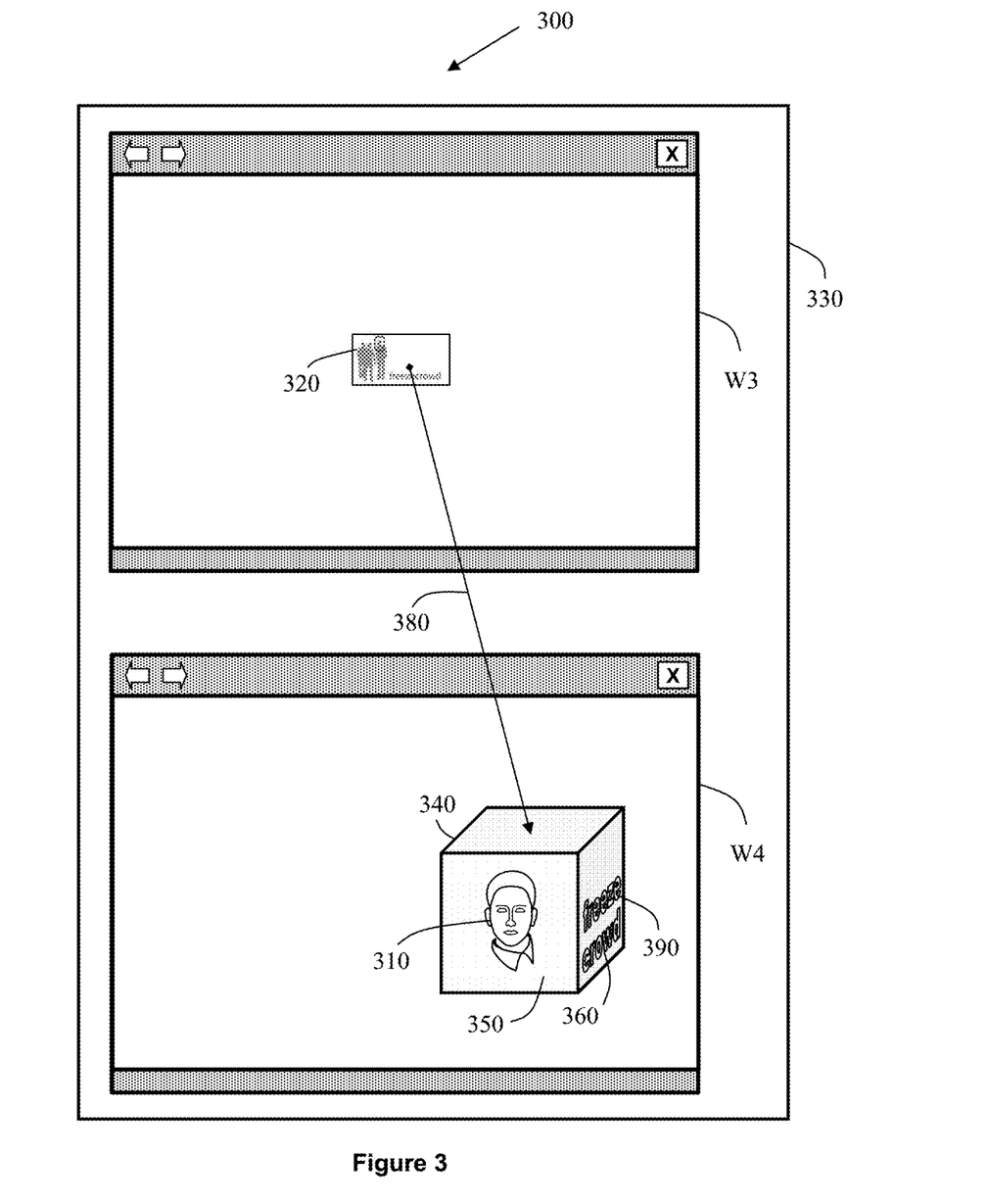
FIG. 3 illustrates an embodiment of a system for recording and displaying that a user is a fan of a subject.

FIG. 3 illustrates an embodiment of a system 300 for recording and displaying a fan 310 of a subject 320.

The system 300 includes a graphical user interface (GUI) 330 including a graphical representation of a three-dimensional shape 340. The three-dimensional shape 340 includes a number of faces including a first face 350 and a second face 360.

In one embodiment, the shape 340 symbolizes the fan 310 in the system 300. The first face 350 may include information corresponding to the fan 310. In the illustrated embodiment, the first face 350 includes a photo corresponding to the fan 310. In other embodiments, information corresponding to the fan 310 other than a photo may be included on the first face 350 or other faces of the shape 340.

The system 300 may be used to record or display that the fan 310 is a fan of the subject 320. The system 300 may receive information declaring that the fan 310 or another user in the system seeks to record that the fan 310 is a fan of the subject 320.

For example, the fan 310 or another user in the system may drag and drop 380 information corresponding to the subject 320 onto the shape 340. In one embodiment, the subject information includes information that identifies the subject 320. In the illustrated embodiment, the subject information is a logo corresponding to the subject 320. In other embodiments, the subject information includes information other than a logo. For example, the subject information may identify the subject by name, company name, website name, trademark, username, and so on. In another example (not shown), the system 300 may receive information declaring that the fan 310 or another user in the system seeks to record that the fan 310 is a fan of the subject 320 by dragging and dropping the shape 340 onto the subject information.

The system 300 records the fan 310 as a fan of the subject 320 at least in part as a result of receiving the information declaring that the fan 310 or another user seeks to record that the fan 310 is a fan of the subject 320.

In the illustrated embodiment, the GUI 330 is shown including two web browser windows W3 and W4. In this example, the shape 340 may be dragged from the web browser window W4 on to the subject information in the web browser window W3. In other embodiments, the GUI 330 may take other forms. For example, the GUI 330 may include more than two web browser windows or the GUI 330 may include a single web browser window. In the latter example, the shape 340 or the subject information may be dragged and dropped within the single web browser window.

In one embodiment, information identifying the subject 320 is associated with subject 320 or may be encoded in the source code for web browser window W3. In the embodiment, information identifying the fan 310 is associated with the shape 340 or encoded in the source code for web browser window W4. When, for example, the information corresponding to the subject 320 is dragged and dropped on the shape 340, the system 300 receives a signal including the encoded identifying information. The system 300 decodes the identifying information and records that the fan 310 is a fan of the subject 320.

The system 300 may also display that the fan 310 is a fan of the subject 320. In the illustrated embodiment, the system 300 displays on the second face 360 subject identifying information 390 indicating that the fan 310 is now a fan of the subject 320.

The system may be used to declare, record, and display that a user, subject, entity, and so on is a fan of another user, subject, entity and so on. Non limiting examples of who or what may be a fan or whom or what may be fanned include a person, a product, a service, a website, a country, a city, a company, a color, a brand, and so on.

In some embodiments, the shape 340, the iFanCube, is the gate to all the information regarding fans and subjects. For example, a user may logging into web sites via the shape 140. If, for example, the user may want to visit sites corresponding to products or services of which a friend is a fan, the user can go to the friend's iFanCube and within the friends iFanCube navigate to the sites corresponding to the products or services. A user can also use his or her own iFanCube to navigate to sites, products, or services of which the user is a fan. Using the iFanCube as the gate to information permits the tracking of user behavior and the collection of feedback and data that providers of products or services can use to improve on their products or services and better target users to improve the user experience.

In some embodiments (not shown), the shape 340, the iFanCube, is implemented within a mobile device. The mobile device may be in data communication with a network such as a cellular network, LAN or WAN. In the movie theater example, through the mobile device and the network, the system 300 may determine the user location as the movie theater. The system 300 may then communicate location information as well as statistical information regarding how many people and who specifically has seen the movie, or is a fan of the actors, the director, and so on. In another embodiment (not shown), the shape 340, the iFanCube, is implemented within a mobile device and the mobile device is in data communication with a network in the movie theater. Communications devices may be installed in, for example, the chairs in the movie theater and the iFanCube may communicate with the network via the chairs. Through the mobile device and the network, the system 300 may determine the location of the user as the movie theater and communicate location information as well as statistical information.

In the systems 100, 200, and 300, information declaring that a user, subject, entity, and so on is a fan may be received by the system in ways other than dragging and dropping as described above. For example, information declaring that a user, subject, entity, and so on is a fan may be received by information corresponding to the fan being entered after the graphical representation of the three-dimensional shape has been clicked on. In another example, information declaring that a user, subject, entity, and so on is a fan may be received by at least a portion of an image corresponding to the fan being clicked on after the graphical representation of the three-dimensional shape has been clicked on.

The systems 100, 200, and 300 may also be used for a user to suggest to an entity (e.g. a person, a friend, persons associated in the system to a geographical location, persons who are all fans of subjects other than the subject being fanned, and so on) that the entity should become a fan of a subject. Similarly, the systems 100, 200, and 300 may also be used for a user to suggest to a subject that the subject should become a fan of the entity. In one embodiment, the recording would not take place automatically upon receipt of information, but the recording would take place upon the fan agreeing with the fanning suggestion.

Figure 4:
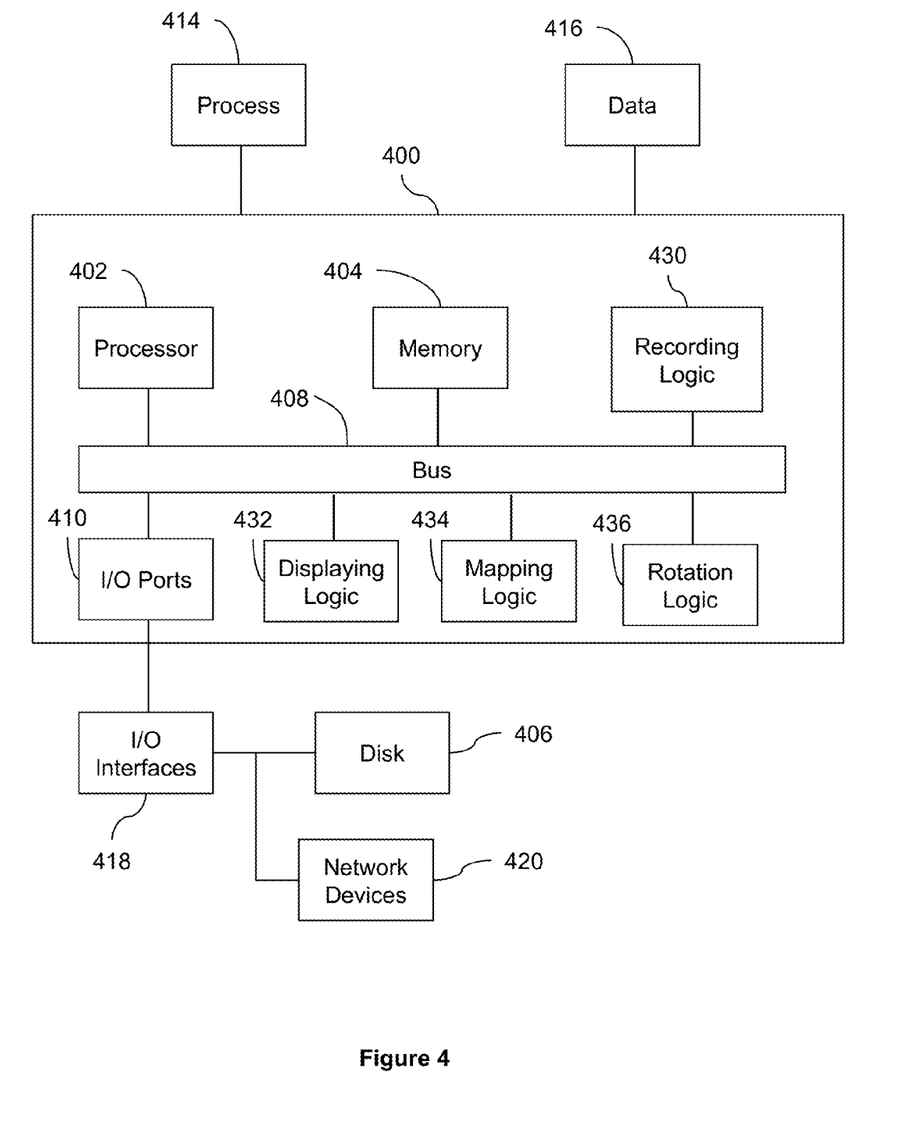
FIG. 4 illustrates a block diagram of a system for recording and displaying that a user is a fan of a subject.

FIG. 4 illustrates a block diagram of a system 400 for recording and displaying that a user is a fan of a subject. System 400 includes a processor 402, a memory 404, and I/O Ports 410 operably connected by a bus 408.

In one example, the system 400 may include a recording logic 430 configured to receive information declaring that at least one fan seeks to fan a subject. The system 400 may also include a displaying logic 432 configured to display information corresponding to the fan after the information declaring that the fan seeks to fan the subject has been received.

The system 400 may also include a mapping logic 434 configured to display the geographical location of the fan on a map. The map may be displayed on one or more of the faces of the graphical representation of the three dimensional shape. The mapping logic 434 may also communicate statistical information regarding fans in the vicinity of the geographical location. The mapping logic 434 may also display on the map fans of the same or similar subjects as the user within close proximity of the user.

The system 400 may also include a rotation logic 436 configured to rotate the graphical representation of the three-dimensional shape to expose a face upon one of a user selection of the face, a cursor hovering over the face and a mouse click of the face. The rotation logic 436 causes the shape to rotate to expose the face.

Thus, these logics, whether implemented in system 400 as hardware, firmware, software, and/or a combination thereof may provide means for recording, displaying, mapping, and rotating, respectively. The logics may be permanently and/or removably attached to the system 400.

The processor 402 can be a variety of various processors including dual microprocessor and other multi-processor architectures. The memory 404 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 406 may be operably connected to the system 400 via, for example, an I/O Interfaces (e.g., card, device) 418 and an I/O Ports 410. The disk 406 can include, but is not limited to, devices like a magnetic disk drive, a solid state disk drive, a floppy disk drive, a tape drive, a Zip drive, a flash memory card, and/or a memory stick. Furthermore, the disk 406 can include optical drives like a CD-ROM, a CD recordable drive (CD-R drive), a CD rewriteable drive (CD-RW drive), and/or a digital video ROM drive (DVD ROM). The memory 404 can store processes 414 and/or data 416, for example. The disk 406 and/or memory 404 can store an operating system that controls and allocates resources of the system 400.

The bus 408 can be a single internal bus interconnect architecture and/or other bus or mesh architectures. While a single bus is illustrated, it is to be appreciated that system 400 may communicate with various devices, logics, and peripherals using other busses that are not illustrated (e.g., PCIE, SATA, Infiniband, 1394, USB, Ethernet). The bus 408 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The system 400 may interact with input/output devices via I/O Interfaces 418 and I/O Ports 410. Input/output devices can include, but are not limited to, a keyboard, a microphone, a pointing and selection device, a mouse, cameras, video cards, displays, disk 406, network devices 420, and the like. The I/O Ports 410 can include but are not limited to, serial ports, parallel ports, and USB ports.

The system 400 can operate in a network environment and thus may be connected to network devices 420 via the I/O Interfaces 418, and/or the I/O Ports 410. Through the network devices 420, the system 400 may interact with a network. Through the network, the system 400 may be logically connected to remote computers. The networks with which the system 400 may interact include, but are not limited to, a local area network (LAN), a wide area network (WAN), and other networks. The network devices 420 can connect to LAN technologies including, but not limited to, fiber distributed data interface (FDDI), copper distributed data interface (CDDI), Ethernet (IEEE 802.3), token ring (IEEE 802.5), Wi-Fi (IEEE 802.11), Bluetooth (IEEE 802.15.1), Zigbee (IEEE 802.15.4) and the like. Similarly, the network devices 420 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, and/or through a network may include combinations and mixtures of communications.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

The invention claimed is:

1. A non-transitory computer readable storage medium having data stored therein representing software executable by a computer, the software including instructions to provide for a manipulation of online images to effectuate recording that an entity is a fan of a subject, the storage medium comprising:
   instructions for configuring a graphical user interface to display a graphical representation of a three dimensional figure having a first face and a second face, where information corresponding to the subject is displayed on the first face with a first online image; and
   instructions for configuring a recording logic to receive information indicating that the entity is a fan of the subject, where the recording logic associates information underlying said first online image and a second online image at least in part by:
      dragging and dropping at least one portion of said second online image on to at least one portion of said first online image, wherein said second online image corresponds to the entity and is linked to encoded identifying information corresponding to the entity;
      decoding the encoded identifying information;
      identifying that the entity is a fan of the subject; and
      recording that identified association.

2. The non-transitory storage medium of claim 1, where the graphical representation of the three dimensional figure is a graphical representation of a cube.

3. The non-transitory storage medium of claim 1, further comprising instructions for configuring the graphical user interface to display at least a portion of the identifying information on the second face of the graphical representation of the three dimensional figure.

4. The non-transitory storage medium of claim 1, where the information corresponding to the entity includes geographical location and the geographical location of the entity is displayed on a map on at least one of the second face or a third face.

5. The non-transitory storage medium of claim 1, where the information corresponding to the subject includes geographical location and the geographical location of the subject is displayed on a map on at least one of the second face or a third face.

6. A non-transitory computer readable storage medium having data stored therein representing software executable by a computer, the software including instructions to provide for a manipulation of online images to effectuate recording that an entity is a fan of a subject, the storage medium comprising:
   instructions for configuring a graphical user interface to display a graphical representation of a three dimensional figure having a first face and a second face, where information corresponding to the subject is displayed on the first face with a first online image; and
   instructions for configuring a recording logic to receive information indicating that the entity is a fan of the subject, where the recording logic associates information underlying said first online image and a second online image at least in part by:
      dragging and dropping at least one portion of said first online image on to at least one portion of said second online image, wherein the second online image corresponds to the entity and is linked to encoded identifying information corresponding to the entity;
      decoding the encoded identifying information;
      identifying that the entity is a fan of the subject; and
      recording that identified association.

7. The non-transitory storage medium of claim 6, where the graphical representation of the three dimensional figure is a graphical representation of a cube.

8. The non-transitory storage medium of claim 6, further comprising instructions for configuring the graphical user interface to display at least a portion of the identifying information on the second face of the graphical representation of the three dimensional figure.

9. The non-transitory storage medium of claim 6, where the information corresponding to the entity includes geographical location and the geographical location of the entity is displayed on a map on at least one of the second face or a third face.

10. The non-transitory storage medium of claim 6, where the information corresponding to the subject includes geographical location and the geographical location of the subject is displayed on a map on at least one of the second face or a third face.

11. A non-transitory computer readable storage medium having data stored therein representing software executable by a computer, the software including instructions to provide for a manipulation of online images to effectuate recording that an entity is a fan of a subject, the storage medium comprising:
   instructions for configuring a graphical user interface to display a graphical representation of a three dimensional figure having a first face and a second face, where information corresponding to the entity is displayed on the first face with a first online image; and
   instructions for configuring a recording logic to receive information indicating that the entity is a fan of the subject, where the recording logic associates information underlying said first online image and a second online image at least in part by:
      dragging and dropping at least one portion of said first online image on to at least one portion of said second online image, wherein the second online image corresponds to the subject and is linked to encoded identifying information corresponding to the subject;
      decoding the encoded identifying information;
      identifying that the entity is a fan of the subject; and
      recording that identified association.

12. The non-transitory storage medium of claim 11, where the graphical representation of the three dimensional figure is a graphical representation of a cube.

13. The non-transitory storage medium of claim 11, further comprising instructions for configuring the graphical user interface to display at least a portion of the identifying information on the second face of the graphical representation of the three dimensional figure.

14. The non-transitory storage medium of claim 11, where the information corresponding to the entity includes geographical location and the geographical location of the entity is displayed on a map on at least one of the second face or a third face.

15. The non-transitory storage medium of claim 11, where the information corresponding to the subject includes geographical location and the geographical location of the subject is displayed on a map on at least one of the second face or a third face.

\* \* \* \* \*